J. L. NATCHEZ.
Stovepipe Damper.
No. 230,805.        Patented Aug. 3, 1880.
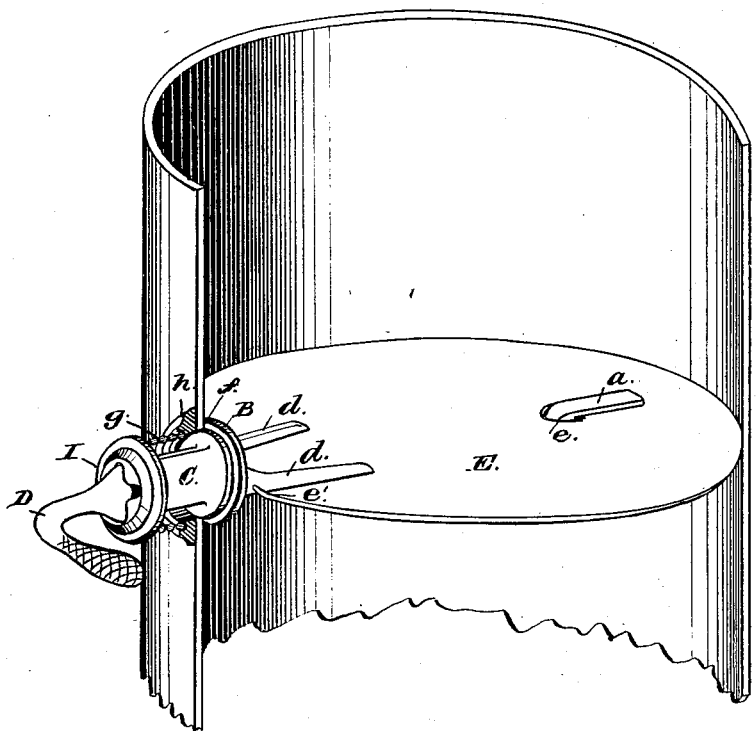
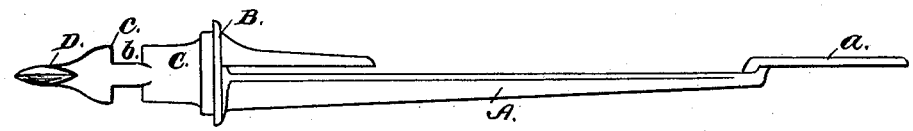
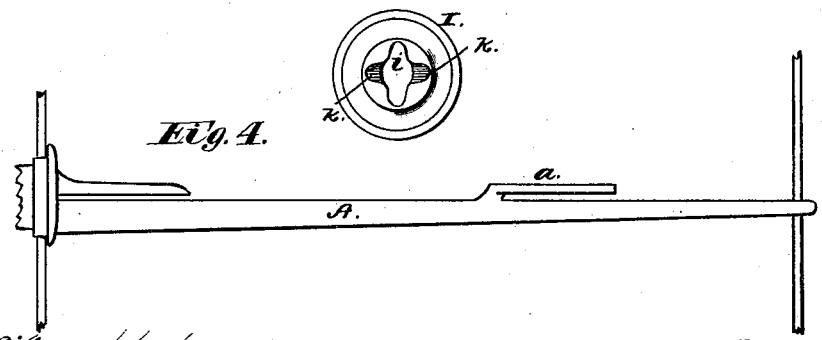
Witnesses:
P. H. Gunckel
E. H. Taylor
Inventor:
Jay L. Natchez
by Peck & Ritchie
Attys.

UNITED STATES PATENT OFFICE.

JAY L. NATCHEZ, OF DAYTON, OHIO.

STOVE-PIPE DAMPER.

SPECIFICATION forming part of Letters Patent No. 230,805, dated August 3, 1880.

Application filed February 24, 1880.

*To all whom it may concern:*

Be it known that I, JAY L. NATCHEZ, of Dayton, in the county of Montgomery and State of Ohio, have invented certain new and useful Improvements in Stove-Pipe Dampers; and I do hereby declare the following to be a full, clear, and exact description of the same.

My invention relates to an improvement in stove-pipe dampers; and my object is to produce an attachment or handle to which, although of uniform size, damper-plates of varying sizes can be readily attached, thus enabling me to sell these handles or attachments to the retail traders, who can apply damper-plates to them to suit any size of pipe desired. By this means scraps and other pieces of sheet-iron can be utilized by converting them into damper-plates.

It also consists in generally improving the construction and method of securing the damper to the pipe.

The novelty consists in the construction and combination of the parts, as will be herewith set forth, and specifically claimed.

In the accompanying drawings, Figure 1 is a perspective view of my improved dampers applied to the pipe. Fig. 2 represents the rod detached. Fig. 3 is a plan view of the retaining-cap. Fig. 4 is a sectional view, showing a modification of my improvement.

The rod forming the axis of the damper (shown particularly in Fig. 2) consists of a bayonet-shaped piece of metal, A, with its end bent up, as seen at $a$, and having its opposite end joined to a shouldered disk, B, from the outer side of which is a flat projection, C, terminating in a bent handle or crank, D. At the junction of the crank and flat portion are slots $b$, forming shoulders $c$, whose office will be hereinafter explained. The length of the bayonet portion A is somewhat less than the diameter of the pipe.

The damper E is any circular piece of metal, which is fitted and fastened to the rod A by having a hole, $e$, cut or formed in it on the line of the diameter, and at such a distance that when the turned-up portion $a$ is inserted through this hole the edge of the damper will be close to the inner side of the disk B, as seen in Fig. 1. The damper is now resting upon the flat top of the rod A, and to hold it in place I provide flaring ears $d$, which project from the disk B over the damper, as shown. These ears prevent any tilting motion of the damper independent of the rod, and to prevent the damper from sliding from under these ears I slightly slit its edge on the outer sides of the ears and bend up retaining-points, as seen at $e'$, Fig. 1. Having thus securely locked the damper to the rod it is ready to be applied to the pipe by cutting a circular hole, $f$, in the pipe of just sufficient size to admit the disk B, as seen in Fig. 1. Now, to clamp the rod and damper in place I employ a spiral spring, $g$, which, encircling the flat portion C, rests against an annular disk, $h$, and is compressed by the cap-piece I, Figs. 1 and 3. As represented, this cap-piece has an opening, $i$, through it to permit of its being passed over the handle and shoulders $c$, whereupon it can be turned half around in the slot and will bring the recesses K under the shoulders. By now releasing the pressure the spring will cause the shoulders to enter the recesses, and a lock will be formed with all the parts in the relations shown in Fig. 1.

The above construction forms a very simple and efficient single-bearing damper, which, however, can be made a double-bearing damper by simply prolonging the rod A, as represented in Fig. 4.

I am aware that single-bearing dampers are old, in which the spindle or shank forms part of the damper and cast with it, as shown in the patent of O. Poole, December 19, 1876, 185,404. Such construction, however, is entirely different from and foreign to the purpose of my invention, which is to provide a spindle to which damper-plates of various sizes can be readily attached.

Having thus fully described my invention, I claim—

1. The combination, with a damper and its crank or handle, having engaging-shoulders $c$, of a slotted and recessed clamping-cap adapted to be slipped over the bent end of said handle, as and for the purpose specified.

2. The combination, with a damper-plate, of a removable single-bearing handle or spindle, which can be applied to plates of varying diameters, and whereby, when so applied, a lock is effected between them independent of the pipe, substantially as described.

3. A damper-handle or rod having an integral stud or rectangular projection, a, adapted to enter an aperture in the damper-plate, and overlapping flaring ears d, for effecting a lock between said handle and the damper-plate, substantially in the manner and for the purpose described.

In testimony whereof I have hereunto set my hand.

JAY L. NATCHEZ.

Witnesses:
 PATRICK H. GUNCKEL,
 CHAS. M. PECK.